United States Patent Office 3,499,048
Patented Mar. 3, 1970

3,499,048
1,1-DICHLORO-2,3,3-TRIFLUOROPROPENE AND METHOD OF PREPARATION
Bernard M. Regan, Chicago, Ill., assignor to Baxter Laboratories, Inc., Morton Grove, Ill., a corporation of Delaware
No Drawing. Filed Jan. 18, 1968, Ser. No. 698,703
Int. Cl. C07c 21/18
U.S. Cl. 260—653.3
2 Claims

ABSTRACT OF THE DISCLOSURE 1,1-dichloro-2,3,3-trifluoropropene, useful as a general anesthetic.

---

The present invention relates to a novel chlorofluoropropene compound, 1,1-dichloro-2,3,3-trifluoropropene, having the structure:

$$CCl_2=CF—CHF_2$$

Surprisingly and unexpectedly, 1,1-dichloro-2,3,3-trifluoropropene has been found to be useful as a general anesthetic for warm-blooded, air-breathing animals. It had been previously reported that 1,2-dichloro-3,3,3-trifluoropropene, which is a position isomer of the novel chlorofluoropropene of this invention, was nonanesthetic in rats. Lu et al., Anesthesiology, vol. 14, pp. 466–72 (1953).

Preparation of 1,1-dichloro-2,3,3-trifluoropropene is accomplished by dehalogenation of the corresponding halogenated propane having two additional halogen substituents on the adjacent carbon atoms where unsaturation is desired, or by dehydrofluorination of the corresponding halogenated propane having an additional central fluorine substituent at the point where the olefinic bond is desired.

In a preferred method of preparation of the novel chlorofluoropropene of this invention, 1,1-dichloro-2,2,3,3,-tetrafluoropropane is reacted with suitable alkaline material, for example, soda lime, at a temperature of from about 70° C. to about 80° C. Substantial conversion to 1,1-dichloro-2,3,3-trifluoropropene has been obtained by this method with reaction times of three hours or more. The novel compound of this invention can then be separated from its reaction components by fractional distillation.

The starting material in the above reaction, 1,1-dichloro-2,2,3,3-tetrafluoropropane, is a known compound and has been described in British Patent 1,004,606.

1,1-dichloro-2,3,3-trifluoropropene is a colorless liquid boiling at 75.5° C. at 760 mm., is non-flammable in air at ambient temperature, is non-explosive in air or oxygen, and has a lower flammability limit in oxygen at 23° C. at a concentration of about 9% by volume, which is well above the maximum concentration required for induction (about 6%) and maintenance (about 4%) of anesthesia in the dog. It is preferably stored in amber colored bottles in admixture with conventional stabilizers such as, for example, thymol. It can be administered by any conventional procedure or means suitable for administration of known general anesthetics to warm-blooded, air-breathing animals. The novel compound of this invention also is stable toward soda lime and, therefore, can be used in conventional re-circulation apparatus which employs soda lime for the absorption of carbon dioxide from the subject undergoing anesthesia.

The utility of the novel chlorofluoropropene of the present invention has been further demonstrated by its inhalation margin of safety in mice when compared with several conventional general anesthetics, namely, chloroform, ether and halothane. Moreover, when tested in dogs, 1,1-dichloro-2,3,3-trifluoropropene has been found to produce a lower incidence of ventricular fibrillation and other arrhythmias associated with epinephrine administration than obtained with chloroform, halothane, and methoxyflurane.

The following example is set forth for purposes of further illustration of the present invention. All percentages are on a weight basis unless otherwise stated.

Example 1,1-dichloro-2,2,3,3-tetrafluoropropane (300 ml., 467 grams, 2.52 moles), $b_{760}$ 77.5° C., $d_4^{20}$ 1.5626, $n_D^{20}$ 1.3557, of 99.9+% purity by gas liquid chromatographic (GLC) analysis, and crushed, low moisture soda lime (270 grams containing about 2% water) were heated to boiling under total reflux for 38 hours. GLC analysis of the liquid reaction product showed it to be greater than 99% 1,1-dichloro-2,3,3-trifluoropropene. The yield of said product was 390 grams, 94% of theory. Fractional distillation gave 1,1-dichloro-2,3,3-trifluoropropene, $b_{757}$ 75.4° C., $d_4^{20}$ 1.5317, $n_D^{20}$ 1.3874, of 99.8% purity by GLC analysis. Its $CCl_2=CF—CHF_2$ structure was confirmed by proton nuclear magnetic resonance (NMR) and infrared spectra.

The physiological effects of 1,1-dichloro-2,3,3-trifluoropropene were demonstrated in white mice by subjecting the mice to various concentrations of said compound vaporized in admixture with air in 6.3 liter desiccator jars, with ten mice used for each concentration. The concentration of anesthetic vapor in admixture with air in the jar was calculated in accordance with the ideal gas law, and the $AC_{50}$ (volume percent of anesthetic compound required to produce negative righting reflex in 50% of the test mice in five minutes) and the $LC_{50}$ (volume percent of anesthetic compound required to kill 50% of the test mice in five minutes) were determined by graphic estimation according to the procedure described by Miller et al., Proc. Soc'y. Exper. Biol. Med., vol. 57, pp. 261–4 (1944). The results, including the calculated inhalation margin of safety ($LC_{50}/AC_{50}$), are set forth in the following table in which the corresponding comparative data for chloroform, ether and halothane determined in identical tests are similarly recorded.

| Compound | $AC_{50}$ | $LC_{50}$ | $LC_{50}/AC_{50}$ |
|---|---|---|---|
| $CCl_2=CF—CHF_2$ | 1.13 | 4.29 | 3.8 |
| Chloroform | 0.94 | 2.56 | 2.7 |
| Ether | 3.69 | 12.0 | 3.2 |
| Halothane | 0.78 | 2.62 | 3.4 |

It is apparent from the above data that 1,1-dichloro-2,3,3-trifluoropropene is a potent anesthetic, has a low toxicity and, overall, has a better margin of safety than the three comparative general anesthetics in common use.

The physiological effects of the novel compound of this invention were also demonstrated in dogs. Surgical depth of anesthesia in each of four dogs was induced in four to five minutes and maintained for 90 minutes with 6% and 3% to 4% concentrations by volume, respectively, of 1,1-dichloro-2,3,3-trifluoropropene vapor admixed with oxygen, employing a conventional anesthesia apparatus and a non-rebreathing system. After 60 minutes of anesthesia, epinephrine was administered intravenously at five minute intervals in sequential 0.3 log dose increments over a range of 0.25 to 32 μg/kg. of body weight.

In the same way, anesthesia in each of five dogs was induced and maintained for 60 to 90 minutes with 2% to 4% and 1% to 2% concentrations by volume, respectively, of halothane vapor admixed with oxygen. Comparisons between halothane and 1,1-dichloro-2,3,3-trifluoropropene were made both before and after epinephrine administrations.

Heart rate and myocardial responses were determined from EKG records. Spontaneous respiratory rate and respiratory minute volume were monitored with a pneumograph and a wet test meter, respectively. Arterial blood pressure was measured, and blood samples withdrawn for blood gases and pH determinations.

1,1-dichloro-2,3,3-trifluoropropene was found to be a substantially better anesthetic than halothane following epinephrine administration. With the former anesthetic agent, no ventricular fibrillation occurred in any of the four dogs at any of the epinephrine doses employed, whereas during halothane anesthesia, an epinephrine dose of 4 $\mu$g./kg. consistently caused fibrillation. Furthermore, during anesthesia with 1,1-dichloro-2,3,3-trifluoropropene, arrhythmias were observed in only one of four dogs and only at epinephrine doses of 4 $\mu$g./kg. or higher, whereas during halothane anesthesia, arrhythmias of long duration occurred frequently at 0.5 to 2.0 $\mu$g./kg. doeses of epinephrine.

Prior to epinephrine administration, anesthesia with 1,1-dichloro-2,3,3-trifluoropropene and halothane were similar to each other. Except for T-wave inversions of two of four dogs with the novel chlorofluoropropene of this invention, and in four of five dogs with halothane, the EKG records were normal. Both compounds produced a fall in diastolic blood pressure below 70 mm. Hg in three dogs. Respiratory minute volume and heart rate were normal or slightly depressed in three of four dogs, and high $pCO_2$ values were observed in all four dogs anesthetized with 1,1-dichloro-2,3,3-trifluoropropene.

As many widely different embodiments of this invention can be made by the person skilled in the art without departing from the spirit and scope thereof, it is to be understood that this invention is not limited to the specific embodiments thereof except as defined in the appended claims.

What is claimed is:
1. 1,1-dichloro-2,3,3-trifluoropropene.
2. The method of preparing the compound of claim 1 comprising the reaction of 1,1-dichloro-2,2,3,3-tetrafluoropropane with soda lime at a temperature of from about 70° C. to about 80° C.

References Cited
UNITED STATES PATENTS 2,673,173   3/1954   Ruh _____ 260—653.5

FOREIGN PATENTS 1,004,606   9/1965   Great Britain.

OTHER REFERENCES

Lu et al.: Chemical Abstracts 48, 1584$^b$ (1954).
Whaley et al.: J. Am. Chem. Soc. 70, 1026 (1948).

DANIEL D. HORWITZ, Primary Examiner

U.S. Cl. X.R.

260—653.5; 424—351